United States Patent
Kudo et al.

(10) Patent No.: US 7,606,464 B2
(45) Date of Patent: Oct. 20, 2009

(54) SIGNAL PROCESSING APPARATUS AND ASSOCIATED METHODOLOGY FOR CONTROLLING THE RECORDING OF DATA STREAMS

(75) Inventors: Tomoaki Kudo, Chiba (JP); Tetsuji Sumioka, Tokyo (JP); Tomoyuki Sato, Kanagawa (JP); Jun Takeshita, Tokyo (JP)

(73) Assignee: Sony Corporation, Tokyo (JP)

( * ) Notice: Subject to any disclaimer, the term of this patent is extended or adjusted under 35 U.S.C. 154(b) by 1200 days.

(21) Appl. No.: 10/864,479

(22) Filed: Jun. 10, 2004

(65) Prior Publication Data

US 2005/0018711 A1    Jan. 27, 2005

(30) Foreign Application Priority Data

Jun. 19, 2003  (JP)  ............................. 2003-175399

(51) Int. Cl.
*H04N 5/76* (2006.01)
(52) U.S. Cl. .................... 386/94; 386/E5.004
(58) Field of Classification Search ............ 386/94, 386/E5.004
See application file for complete search history.

(56) References Cited

U.S. PATENT DOCUMENTS

2002/0067744 A1 * 6/2002 Fujii et al. ............... 370/535

FOREIGN PATENT DOCUMENTS

| EP | 959467 | * 11/1999 |
|---|---|---|
| JP | 11-239175 | 8/1999 |
| JP | 2000-165361 | 6/2000 |
| JP | 2000-183837 | 6/2000 |
| JP | 2001-223981 | 8/2001 |

* cited by examiner

*Primary Examiner*—David E Harvey
(74) *Attorney, Agent, or Firm*—Oblon, Spivak, McClelland, Maier & Neustadt, L.L.P.

(57) ABSTRACT

A data stream inputted to the inventive system from the outside is supplied to a PID (packet ID) extracting circuit 1, in which a PID is detected from a transport stream TS regardless of whether the transport stream TS is a full transport stream TS or a partial transport stream TS. The PID extracting circuit 1 transmits the thus extracted PID and data stream to a TS replacing/deleting circuit 2. The TS replacing/deleting circuit 2 has n 188-byte buffers and is able to set replaced TS packets to the buffers. A control circuit 3 such as a CPU (central processing unit) designates m PIDs relative to the respective buffers and designates the respective PIDs as the PID of the packet to be deleted or the PID of the packet to be replaced. Then, the TS replacing/deleting circuit 2 compares the PID received from the PID extracting circuit 1 with the PID designated by the control circuit 3. If they are identical to each other, then the PID that is set to be replaced is replaced and the PID that is set to be deleted is deleted. Thus, the packet indicative of attribute of data can be replaced satisfactorily.

22 Claims, 10 Drawing Sheets

SIGNAL PROCESSING APPARATUS AND ASSOCIATED METHODOLOGY FOR CONTROLLING THE RECORDING OF DATA STREAMS

BACKGROUND OF THE INVENTION

1. Field of the Invention

The present invention relates generally to a signal processing apparatus, a signal processing method, a recording limiting apparatus and a recording limiting method suitable for use in accumulating bit streams inputted through a suitable means such as digital broadcasting and information networks on a recording media such as a disc. More specifically, this invention relates to a signal processing apparatus, a signal processing method, a recording limiting apparatus and a recording limiting method in which a packet indicative of attribute of data can be replaced satisfactorily when recording of inputted bit streams, for example, is limited.

2. Description of the Related Art

As a means for limiting recording of bit streams, there has so far been proposed a method of adding or deleting particular information to or from an orthogonal transform coefficient, for example (e.g. see cited patent reference 1).

[Cited Patent Reference 1]

Official Gazette of Japanese laid-open patent application No. 2001-223981

Satellite broadcasting, for example, transmits information such as image information and audio information in the form of digital signals and hence the thus transmitted image information and audio information are very high in quality. However, since image information and audio information are transmitted in the form of digital signals, personal computers and audio-video equipment become able to very easily handle data, and image information and audio information can easily be copied without deteriorating quality of information, which may cause a problem in a broadcasting program with a copyright.

Accordingly, in the satellite broadcasting, for example, a signal (attribute information) indicative of copy protect is encapsulated in advance into a copy guard program due to a restriction such as a copyright. When a receiver of the satellite broadcasting detects such signal, the receiver is requested to protect the above broadcasting program from being copied to other audio equipment than the receiver.

The above-mentioned copying is to record data outputted from the receiver to other equipment, and to temporarily store data in a suitable means such as a disc in order to process images for various services such as fast forward and rewind in the receiver is not included in the copying. For this reason, satellite broadcasting data has a signal for allowing the receiver to copy audio and video information (copy once).

Accordingly, when such data is transmitted from the receiver to the outside, in order to prevent illegal copying, a copy control signal (attribute information) should be changed from the above-mentioned "copy once" to "copy guard".

It is customary that the copy control signal is provided as part of information called a Program Map Table (hereinafter referred to as a "PMT" for simplicity). On the other hand, in the satellite broadcasting, for example, a broadcasting program is generally transmitted in the form of a Transport Stream (hereinafter referred to as a "TS" for a simplicity). The transport stream TS has data provided in the form called a "section", and the PMT is contained in this section.

Figure 2:
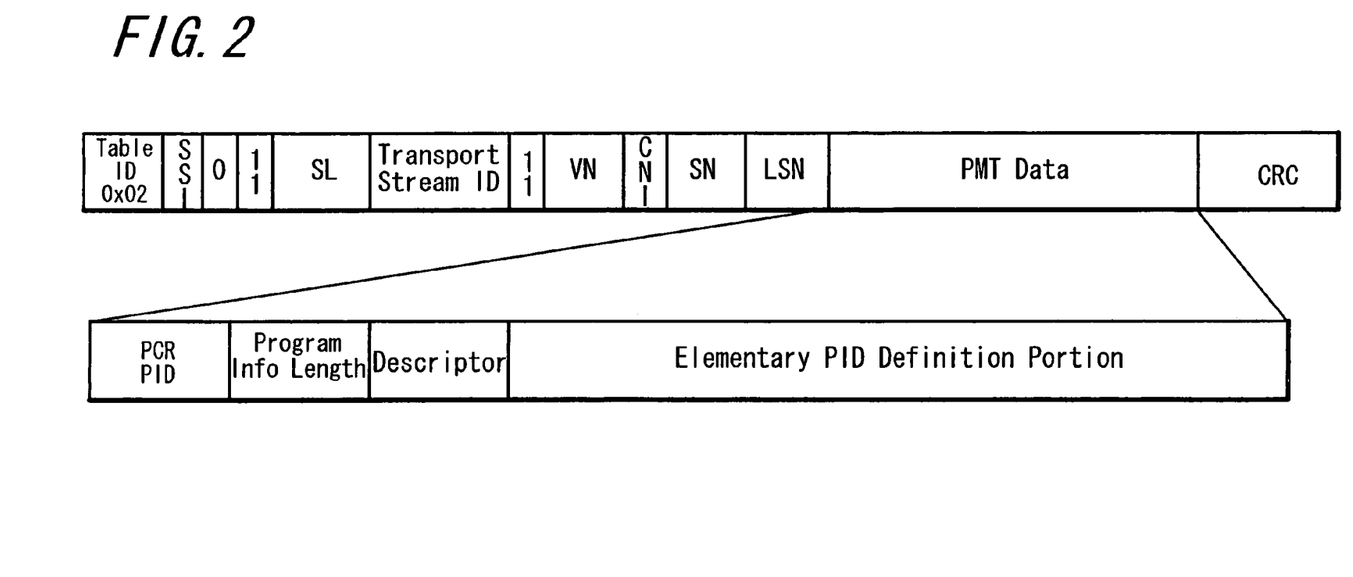
FIG. 2 is a diagram used to explain a Program Map Table (PMT) provided in a copy control signal.

Further, the PMT has an arrangement shown in FIG. 2. As shown in FIG. 2 the value of Table ID is fixed to 02, and it is possible to judge the PMT by detecting this portion. Also, a SL (section length) indicates the length of this PMT and only the range shown by this section length SL is the PMT. Then, the copy control signal is contained in the descriptor shown in FIG. 2, and this portion should be rewritten in order to make copy free data become copy guard data.

As a method for rewriting such PMT, there have been so far used the following two methods. More specifically, according to the first method, all data are written on a recording medium such as a disc in a receiver and when a control circuit such as a CPU (central processing unit) searches data on the disc from the disc end and detects the PMT, the detected PMT is overwritten on the disc. According to the second method, when data is received by the receiver, the PMT is deleted in advance, and a signal indicative of the place of the PMT is flagged. Then, when the PMT is replaced, a new PMT is inserted into data based upon the signal indicative of such place of the PMT.

However, according to the first method, the control circuit has to search the data on the disc so that a load is imposed upon the control circuit, resulting in the performance of the whole of the receiver being lowered. Also, since a large-storage capacity disc becomes necessary, there is a risk that the first method becomes costly. Further, since an amount of processing to be executed by the control circuit such as the CPU increases as the receiver becomes higher in function, it becomes necessary to protect a load from being imposed upon the CPU as much as possible.

On the other hand, the second method in which the PMT is deleted in advance requires a circuit for deleting the PMT from the received stream data and a circuit for generating a signal indicative of the position of the deleted PMT in addition to the circuit for rewriting the PMT. There is then a risk that a circuit scale will become extremely large. Also, when the control circuit such as the CPU executes such processing, it is unavoidable that the load on the control circuit increases similarly to the above-mentioned first method. As described above, the related-art apparatus has encountered with the problems such as the increase of the loads on the control circuit and the requirements of the large-storage capacity disc, the special circuit and the increase of the cost, and hence it cannot replace the packet indicative of the attribute of the data satisfactorily.

SUMMARY OF THE INVENTION

In view of the aforesaid aspect, it is an object of the present invention to provide a signal processing apparatus, a signal processing method, a recording limiting apparatus and a recording limiting method in which the above-mentioned problems can be solved.

It is another object of the present invention to provide a signal processing apparatus, a signal processing method, a recording limiting apparatus and a recording limiting method in which a PID (packet ID) detecting circuit for detecting the position of a PMT (program map table) is incorporated, whereby a PMT of an inputted stream can be replaced or deleted without using a recording medium such as a disc, the incorporated CPU (central processing unit) is not used, a signal indicating that the PMT has been deleted is omitted and hence the circuit can be simplified in arrangement.

According to an aspect of the present invention, there is provided a signal processing apparatus into which a control information packet is inputted together with a contents information packet in the form of a single stream. This signal processing apparatus is comprised of a circuit for detecting attribute information of the stream from the control information packet in the stream, a circuit for determining whether the detected attribute information is identical to previously-set information and a circuit for replacing or deleting the control information packet in accordance with other arbitrary setting if it is determined that the detected attribute information is identical to the previously-set information.

According to other aspect of the present invention, there is provided a signal processing method into which a control information packet is inputted together with a contents information packet in the form of a single stream. This signal processing method is comprised of the steps of detecting attribute information of the stream from the control information packet in the stream, determining whether the detected attribute information is identical to previously-set information and replacing or deleting the control information packet in accordance with other arbitrary setting if it is determined that the detected attribute information is identical to the previously-set information.

According to a further aspect of the present invention, there is provided a recording limiting apparatus for use in recording an information signal into which a control information packet is inputted together with a contents information packet in the form of a single stream. This recording limiting apparatus is comprised of a circuit for detecting attribute information of the stream from the control information packet in the stream, a circuit for determining whether the detected attribute information is identical to previously-set information and a circuit for replacing or deleting the control information packet in accordance with other arbitrary setting if it is determined that the detected attribute information is identical to the previously-set information, wherein the control information packet replacing or deleting circuit outputs a processed output to a recording circuit after it has replaced the copy free control information packet with a copy guard control information packet.

In accordance with yet a further aspect of the present there is provided a recording limiting method for use in recording an information signal into which a control information packet is inputted together with a contents information packet in the form of a single stream. This recording limiting method is comprised of the steps of detecting attribute information of the stream from the control information packet in the stream, determining whether the detected attribute information is identical to previously-set information and replacing or deleting the control information packet in accordance with other arbitrary setting if it is determined that the detected attribute information is identical to the previously-set information, wherein the control information packet replacing or deleting step outputs a processed output to a recording circuit after it has replaced the copy free control information packet with a copy guard control information packet.

DESCRIPTION OF THE PREFERRED EMBODIMENTS

A signal processing apparatus, a signal processing method, a recording limiting apparatus and a recording limiting method according to an embodiment of the present invention will be described with reference to the drawings. Specifically, a circuit arrangement of an inventive system for replacing or deleting a transport stream (TS) having specific PID (attribute information) will be described with reference to FIG. 1.

Figure 1:
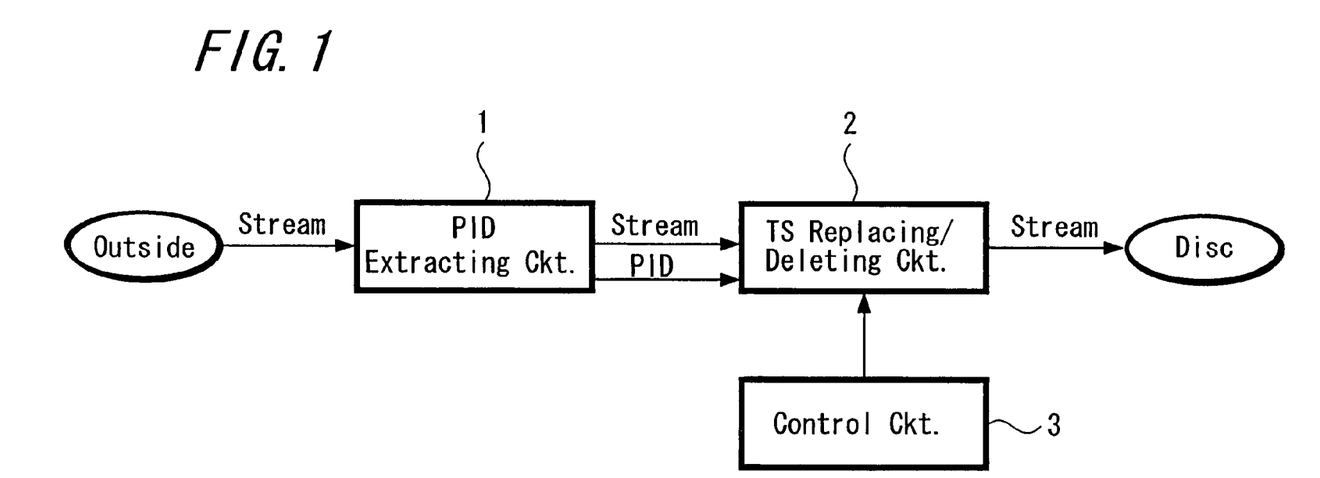
FIG. 1 is a schematic block diagram showing an arrangement of a signal processing apparatus according to an embodiment of the present invention.

As shown in FIG. 1, a data stream inputted to the inventive system from the outside is supplied to a PID (packet ID) extracting circuit 1, in which a PID thereof is extracted from the transport stream TS regardless of whether the transport stream TS is a full transport stream TS or a partial transport stream TS. The PID extracting circuit 1 supplies the thus extracted PID and stream to a TS (transport stream) replacing/deleting circuit 2. The TS replacing/deleting circuit 2 includes n 188-byte buffers and can set the replaced TS packets in the n 188-byte buffers.

A control circuit 3 such as a central processing unit (CPU) designates m PIDs to the respective buffers and designates the PID of the packet that should be either deleted or replaced.

Then, the TS replacing/deleting circuit 2 compares the PID received from the PID extracting circuit 1 with the PID designated by the control circuit 3. If it is determined based upon the compared result that the two PIDs are identical to each other, then the TS replacing/deleting circuit 2 replaces the PID that is set to be replaced or deletes the PID that is set to be deleted. If on the other hand it is determined that the two PIDs are not identical to each other, then the inputted data stream is outputted to a recording disc as it is and the extracted PID is discarded.

Figure 3:
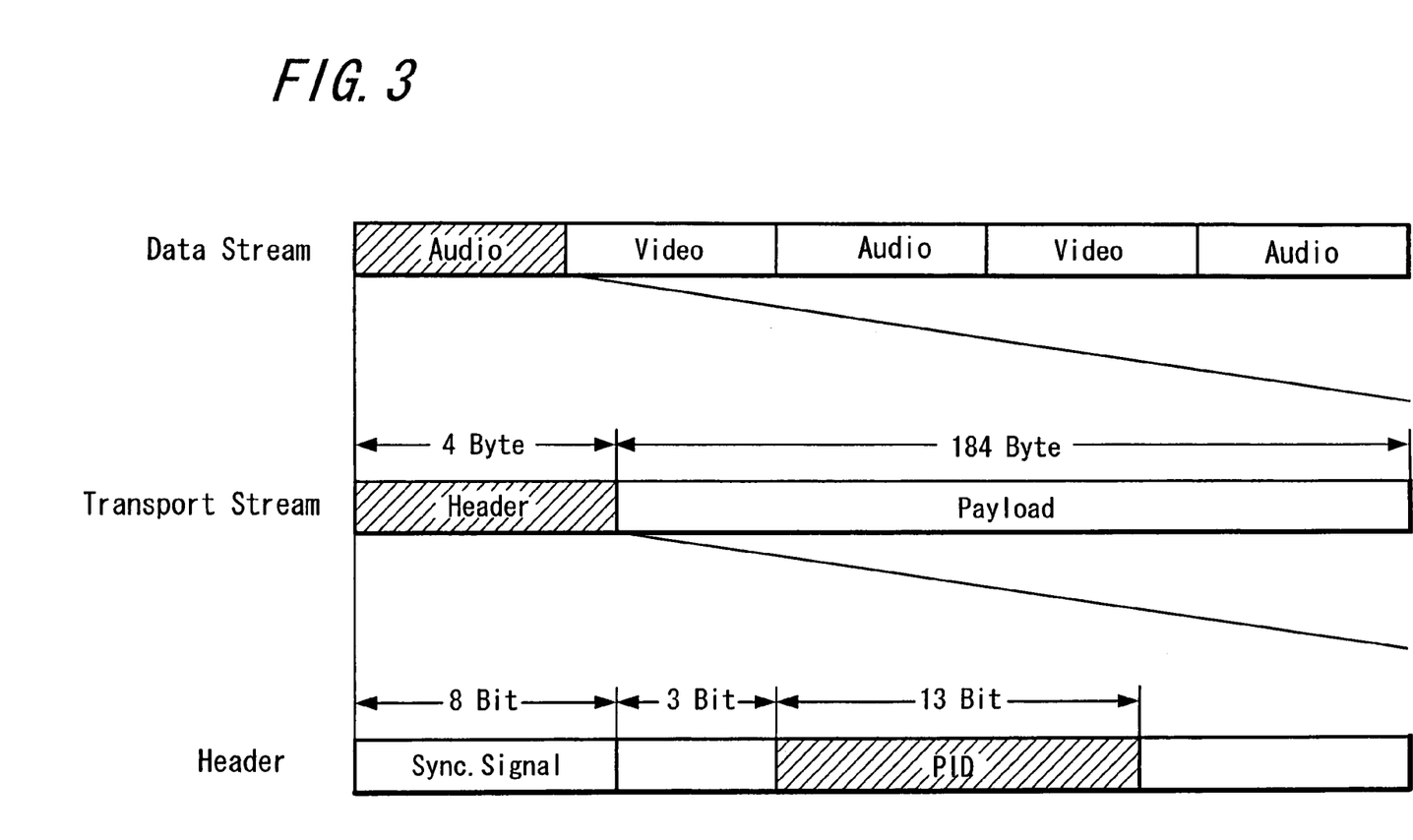
FIG. 3 is a diagram used to explain a structure of a data stream according to the present invention.

Next, a structure of data stream that is to be handled by the present invention will be described with reference to FIGS. 1 and 3. More specifically, according to the present invention, the packets of contents information and the packets of control information are inputted to the inventive system in the form of a single data stream.

It is not easy to simultaneously transmit video data, audio data and contents information such as other program information and control information necessary for controlling reproduction of video data, audio data and contents information to general viewers from a data amount standpoint. Accordingly, in the digital broadcasting, data of respective kinds are divided into the 188-byte fixed length packet called the transport stream TS. Then, the divided packets are multiplexed in a time-division manner and thereby transmitted in the form of a single data stream.

PID data in the transport stream TS indicates the kinds of data stored in the packet. More specifically, as shown in FIG. 3, a 4-byte header is contained in the leading portion of each transport stream TS. The header contains the PID, a synchronizing signal indicative of the leading portion of the transport stream TS, a signal indicative of attribute of the transport stream TS and the like. The PID has a length of 13 bits ranging from 12th bit to 24th bit of the header.

Further, each transport stream TS contains only one kind of packet. The transport stream TS that contains audio data is a transport stream composed of all audio data, and the transport stream TS that contains video data is a transport stream composed of all video data. When a channel is a different channel, the PIDs which are different at every channel are allocated to even the video stream. Also, a leading pulse indicative of the leading portion of the transport stream TS and an enable signal indicating the fact that data is effective data are inputted to a set-top box (hereinafter referred to as a "STB" for simplicity), which is a digital broadcasting receiver, together with the data stream at the same time.

Figure 4:
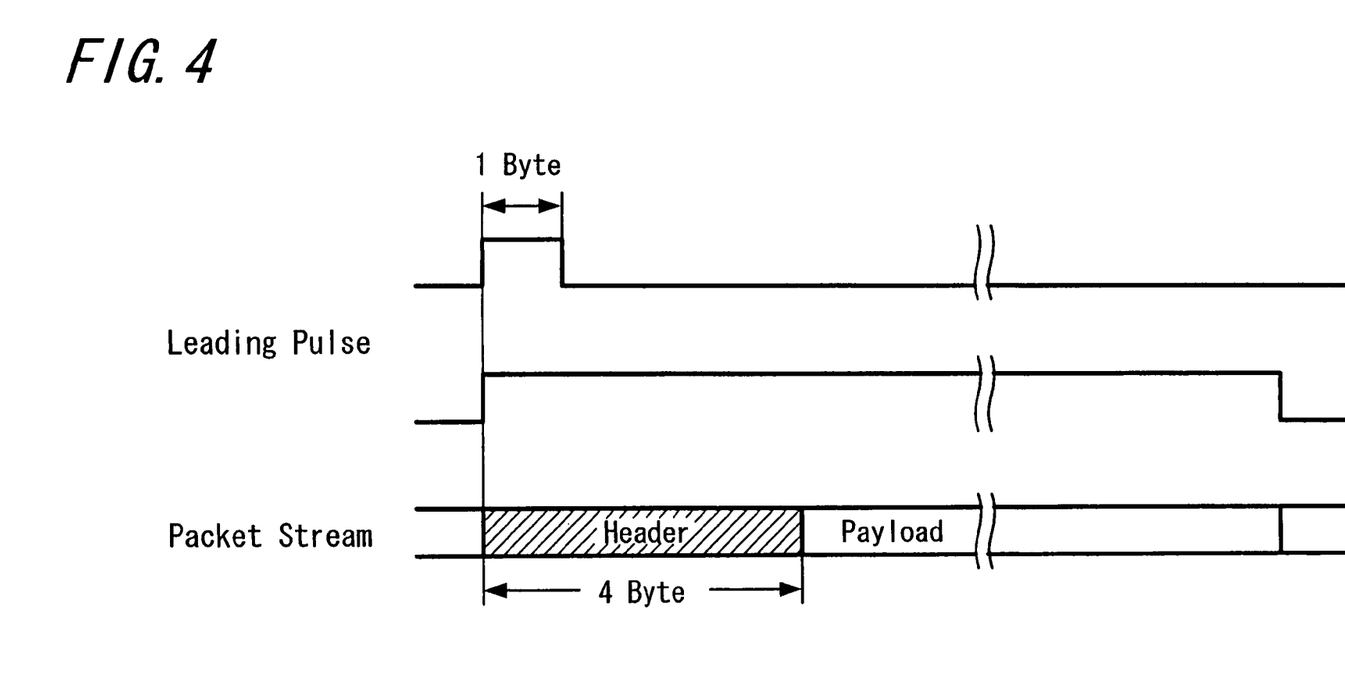
FIG. 4 is a schematic diagram showing a relationship between data of a packet unit of a transport stream (TS), a leading pulse and an enable signal on a time-axis.

FIG. 4 shows a relationship among the data of the packet unit, the leading pulse and the enable signal of the transport stream TS on the time-axis. Although the transport stream TS is composed of 188 bytes, it cannot always be made continuous and there is a possibility that a data invalid interval will be interposed between the respective data depending on the conditions such as a transfer rate. In the present invention, let us describe the embodiment of the present invention on the assumption that one packet is composed of continuous data. In FIG. 4, the left-hand side represents old data and the right-hand side represents new data.

As shown in FIG. 4, the leading pulse is inputted to the STB in synchronism with data of first byte at the leading portion of the transport stream TS. The enable signal becomes active only when data is effective. Further, at the same time the packet of the transport stream TS is started, the leading pulse and the enable signal start rising. Then, although the leading pulse falls after one clock, the enable signal falls after the end of one packet. More specifically, it is possible to detect the starting portion of the packet by detecting the leading pulse, and also it is possible to determine by checking the enable signal whether or not the transmitted data is effective data.

Figure 5:
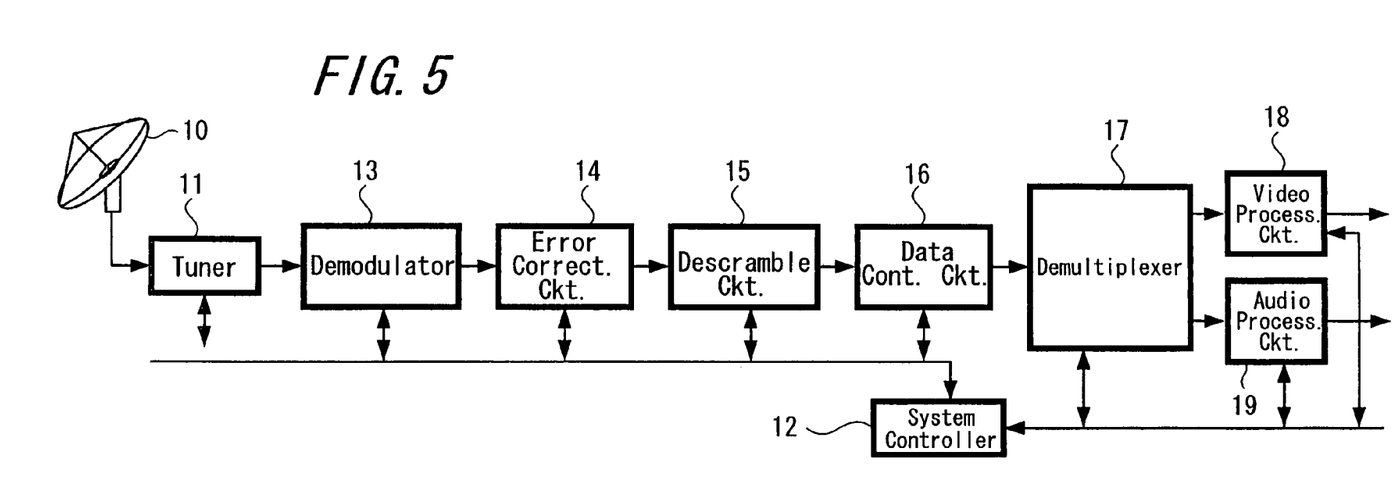
FIG. 5 is a block diagram showing an arrangement of a system of a set-top box (STB)

FIG. 5 is s block diagram showing an arrangement of a system of a STB (set-top box) which may handle these data. As shown in FIG. 5, a satellite broadcasting program with the TS format is received at a parabola antenna 10 and supplied to a tuner 11, in which a transponder signal with a desired carrier frequency is selected from the received signal. A reception frequency of the tuner 11 is set based on an output from a system controller 12. Then, an output of the tuner 11 is supplied to a demodulator 13.

Further, an output from the demodulator 13 is supplied to an error-correcting circuit 14. The error-correcting circuit 14 error-corrects the thus supplied data by using a Reed-Solomon code. An output from the error-correcting circuit 14 is supplied to a descrambler 15. The descrambler 15 carries out CAS (condition access system) control. When reception of program of satellite broadcasting is limited, the descrambler 15 descrambles the supplied data. A transport stream is obtained from the output of the descrambler 15.

The transport stream outputted from the descrambler 15 is supplied to a data control circuit 16, and the data control circuit 16 replaces the packet set by the system controller 12 with a value that was set in advance in the system controller 12 or deletes the packet set by the system controller 12. The above-mentioned system shown in FIG. 1 is included in this data control circuit 16.

Then, the transport stream obtained after part of the packets has been deleted by the data control circuit 16 is supplied to a demultiplexer 17. When the data control circuit 16 deletes the packet, the data control circuit 16 outputs a deleted signal to the demultiplexer 17. Further, the demultiplexer 17 demultiplexes a desired packet from the inputted transport stream in accordance with the output from the system controller 12.

Figure 6:
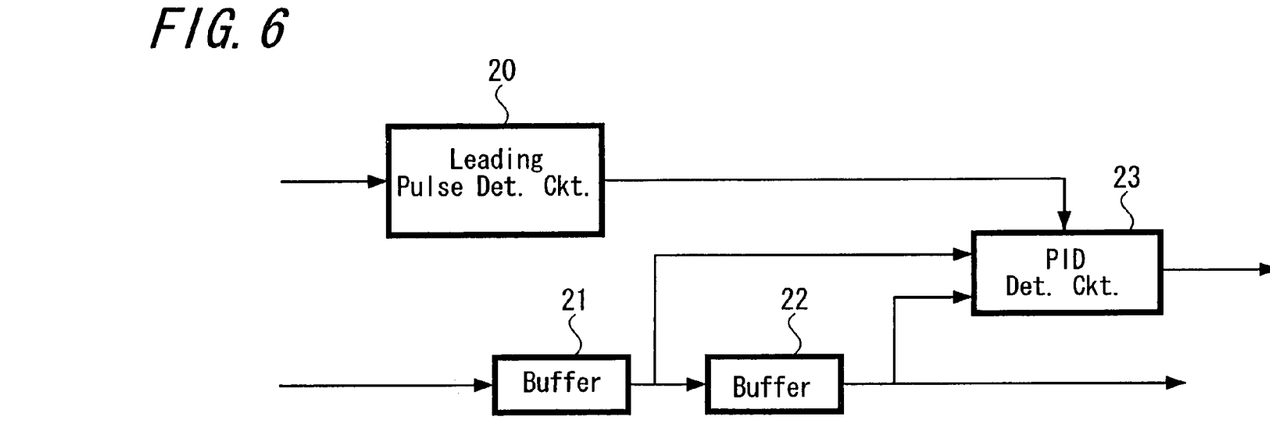
FIG. 6 is a block diagram showing an arrangement of the PID extracting circuit 1 shown in FIG. 1 more fully.

In this manner, the transport stream is separated into an audio stream, a video stream and a data stream, whereby the video stream is supplied to a video processing unit 18, the audio stream is supplied to an audio processing unit 19 and the data stream is supplied to the system controller 12. Further, the video processing unit 18 executes an MPEG2 system decode processing to generate a video signal. Also, the audio processing unit 19 executes an MPEG2-AAC (Advanced Audio Coding) system decoding processing to generate an audio signal. FIG. 6 is a schematic block diagram showing an arrangement of the PID extracting circuit 1 shown in FIG. 1 more fully. More specifically, when the PID is detected, the PID is obtained from the leading pulse that is inputted to the system together with the data stream at the same time. The position of the PID lies in a range from the 12th bit to the 24th bit from the leading portion of the packet, and lies in a range from the 4th bit of 2 bytes to the whole of 3 bytes from a byte standpoint. Accordingly, it is necessary to extract 13 bits from the data stream.

While data is inputted to a PID detecting circuit shown in FIG. 6 byte by byte, data of 2 bytes are maintained in buffers (flip-flop circuits) 21, 22 within the PID detecting circuit. Then, when a leading pulse detecting circuit 20 detects the leading pulse, data that is inputted simultaneously is the first byte of the packet and hence this data is not extracted. However, since the next data and the following data after the next data contain PIDs so that a skip signal indicative of the skipped first byte data is stored in the PID extracting circuit 23.

Then, the next data of two bytes are maintained in the buffers 21, 22, and the aforementioned skip signal is cleared. In this manner, the PIDs are extracted from the data of the two bytes maintained in the buffers 21, 22 by the PID extracting circuit 23. More specifically, the PIDs are extracted from the fourth bit of the second byte stored in the butter 22 and the PIDs are extracted from third byte maintained in the buffer 21.

Figure 7:
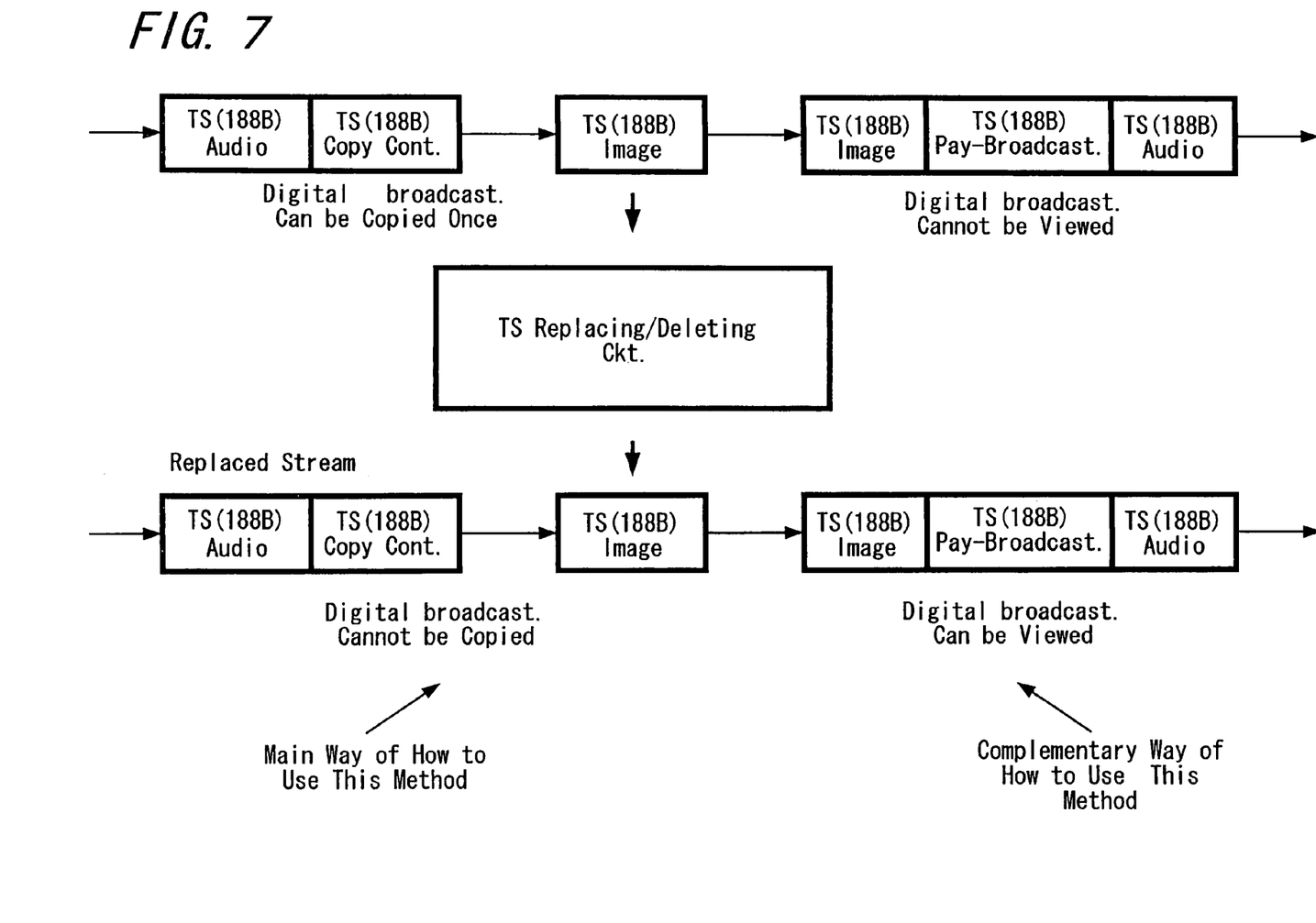
FIG. 7 is a schematic diagram used to explain necessity with which a transport stream (TS) packet should be replaced.

Further, necessity with which the TS packets should be replaced will be described with reference to FIG. 7. More specifically, data for controlling copying (dubbing) and viewing of pay-broadcasting are contained in the transport stream TS. With respect to control of copying, in the case of copy free data, video and audio streams are reproduced or stored in a recording media without controlling of copying.

However, since the digital broadcasting is high in quality, in order to prevent copying, it is customary to make digital broadcasting data become copy-protect broadcasting data when digital broadcasting data is outputted from a satellite broadcasting receiver. However, in most cases, the owner of the satellite broadcasting receiver is allowed to copy once the digital broadcasting program for personal use and the copying of the copied media to other media is inhibited. To this end, a control signal is changed in such a manner that the satellite broadcasting program can be copied once to the first media but the copied satellite broadcasting program can be inhibited from being copied from the first media to other media.

Also, in the case of the pay-broadcasting, although the radio waves of such pay-broadcasting can be received by general receivers, the video and audio data of the pay-broadcasting are scrambled (encrypted), and hence those who do not pay charges of the pay-broadcasting are unable to view the programs of the pay-broadcasting. In this case, the transport stream contains a control signal indicative of scrambled video and audio data, and it is assumed that the charges of the pay-broadcasting are not paid in the first stage. Then, when the receiver recognizes that a viewer has paid the charge of the pay-broadcasting, this control signal is rewritten as a control signal indicating that the charge of the pay-broadcasting was already paid, whereafter a descrambler (decoder) circuit is actuated so that the viewer becomes able to view the program of the pay-broadcasting normally.

Next, the manner in which the target transport stream TS is to be replaced or deleted will be described with reference to FIG. 8. In order to replace the transport stream TS, there are provided n buffers in which replaced data are set previously. The memory size of one buffer is 188 bytes in order to replace the transport stream TS at the unit of the transport stream TS. The n buffers have the order of priority for replacing the transport stream TS, and the order of priority becomes higher in the sequential order of a buffer 0, a buffer 1, a buffer 2, . . . a buffer n.

Further, m target transport streams TS that are to be replaced can be designated to each buffer. Also, the transport streams TS need not always be replaced but the transport stream TS of the target PID can be deleted. If the deletion of the transport stream TS is set, then the deletion of the transport stream TS of the target PID is constantly effective. In the case of the replacement of the transport stream TS, once the transport stream TS is replaced, the transport stream TS may not be replaced next.

Figure 8:
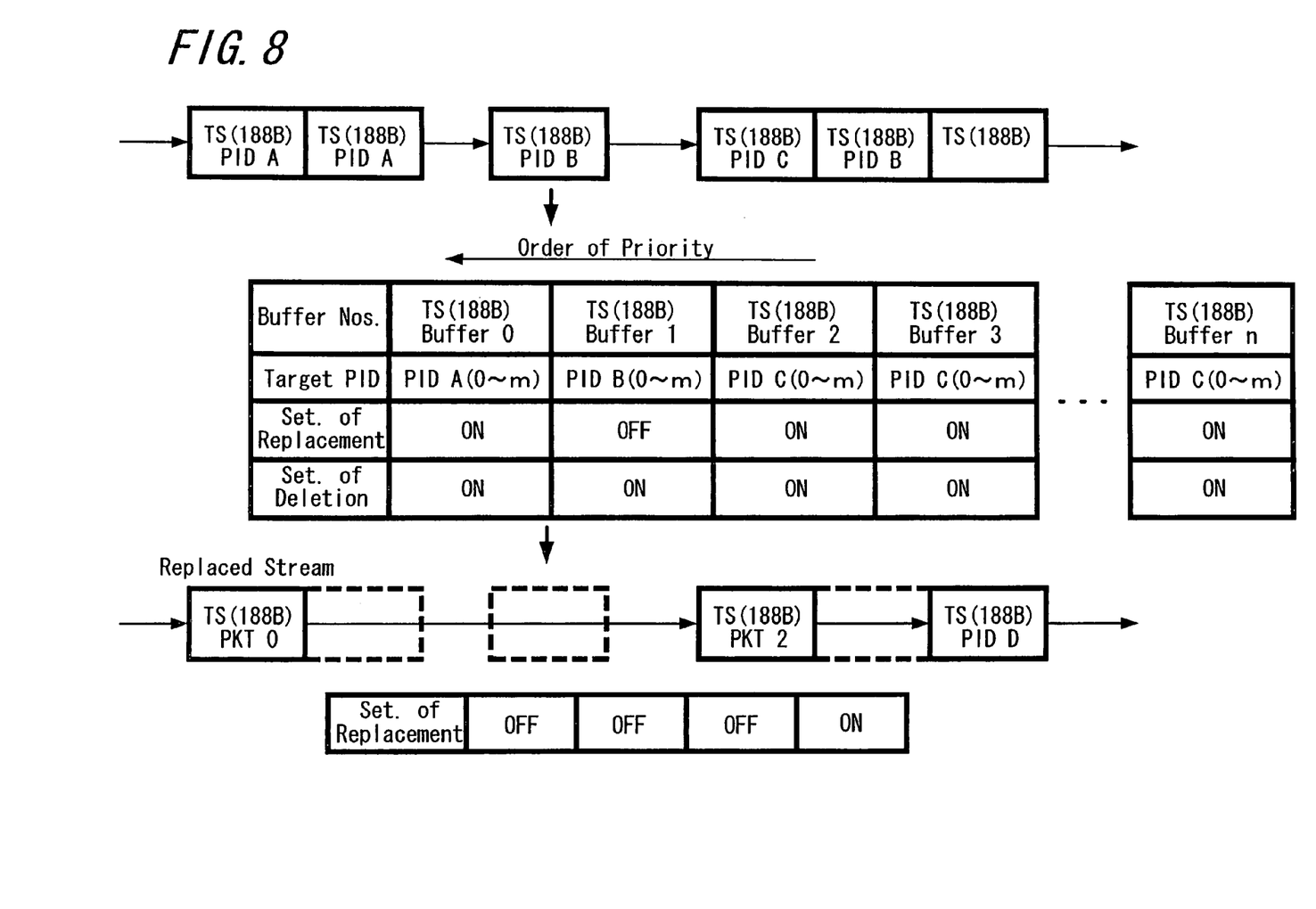
FIG. 8 is a schematic diagram used to explain the manner in which a target transport stream (TS) is to be replaced or deleted.

As shown in FIG. 8, since the replacement setting of the transport stream TS of the PID-A is set to ON in the buffer 0, when the transport stream TS of the PID-A is detected, the transport stream TS of the PID-A is replaced with the content of the buffer 0, and the replacement setting of the PID-A is turned OFF in the buffer 0. As a result, the transport stream TS of the next PID-A is not replaced but deleted.

Also, since the replacement setting of the transport stream TS of the PID-B is OFF and the deletion setting of the transport stream TS of the PID-B is ON, the transport stream TS of the PID-B is deleted constantly. Further, since the replacement setting of the transport stream TS of the PID-C is ON in the buffers 2 and 3, the transport stream TS of the PID-B is replaced with the transport stream TS in the buffer 2. After that, the replacement setting of the PID-C is turned OFF in the buffer 2 and the transport stream TS of the next PID-C is replaced with the transport stream TS in the buffer 3.

Figure 9:
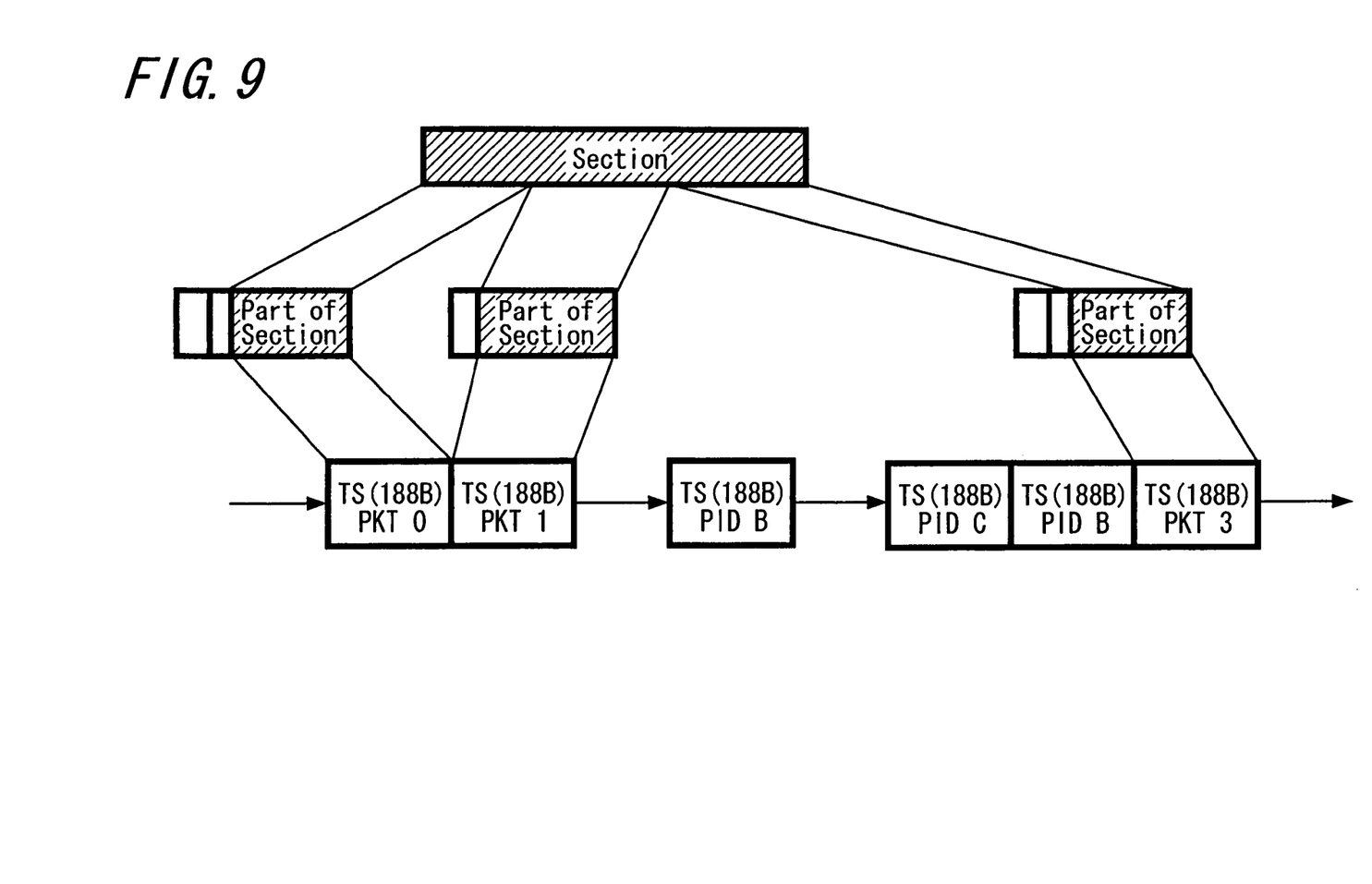
FIG. 9 is a diagram used to explain a priority in which it is intended to replace a program map table (PMT) or a specific transport stream (TS) among a plurality of transport streams TS.

The order of priority will be further described with reference to FIG. 9. More specifically, the above-mentioned circuit replaces the transport stream TS on a transport stream-by-transport stream basis, and when the above-mentioned circuit intends to replace the PMT (program map table) and other specific transport stream TS lying across a plurality of transport streams TS, it uses the order of priority.

In this case, in the section of the same kind such as the program map table PMT lying across a plurality of transport streams TS, each transport stream TS has the same PID (packet ID). Accordingly, when a certain PID and a certain data to be replaced are replaced with each other in a one-to-one relationship, each one portion of the section is replaced with the same data. For this reason, it becomes necessary to sequentially change data to be replaced in accordance with the order in which the transport streams TS with the same PID are inputted.

Figure 10:
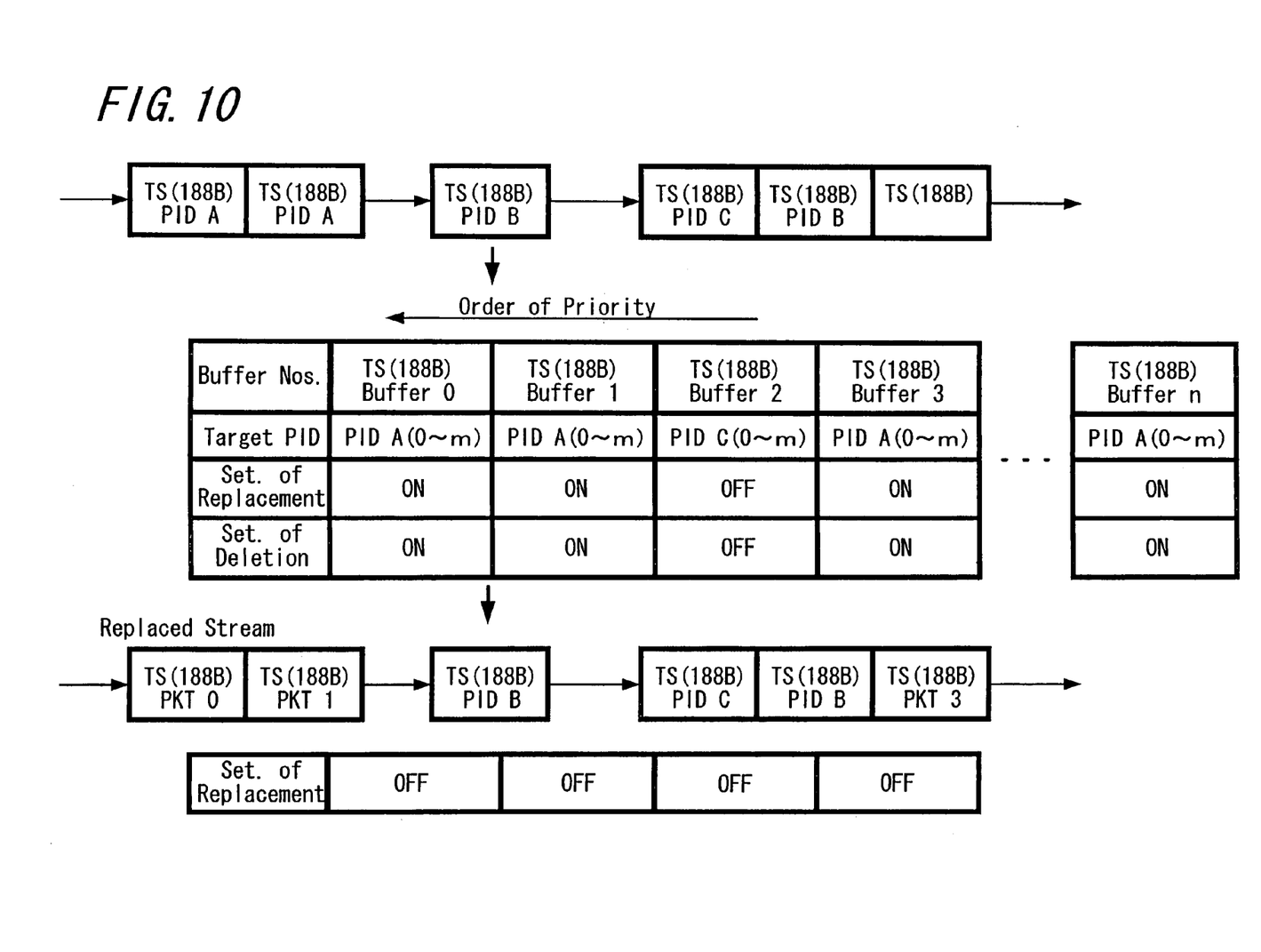
FIG. 10 is a diagram used to explain the manner in which a stream having a PID-A over a plurality of transport streams TS should be replaced.

Accordingly, as shown in FIG. 10, when the transport stream TS having the PID-A across a plurality of transport streams TS is replaced, the replaced transport stream is set to the buffers 0 to n at the unit of the transport stream TS. Leading 188-byte data of the replaced transport stream TS is set to the buffer 0, the next leading 188-byte data of the replaced transport stream TS is set to the buffer 1, and the next leading 188-byte data of the replaced transport stream TS is set to the buffer 2, and so on.

Accordingly, with the above-mentioned setting, when the target transport stream TS to be replaced is inputted to the system, the leading 188-byte data of the transport stream TS is replaced with the data stored in the buffer 0, and the data stored in the buffer 0 is not replaced anymore next time. When the next leading 188-byte data of the transport stream TS is inputted to the system, it is replaced with the data of the transport stream TS stored in the buffer 1, and the data stored in the buffer 1 is not replaced any more. In this manner, the contents of the buffers are replaced in the sequential order, and the transport stream TS lying across a plurality of transport streams TS can be replaced successively.

Figure 11:
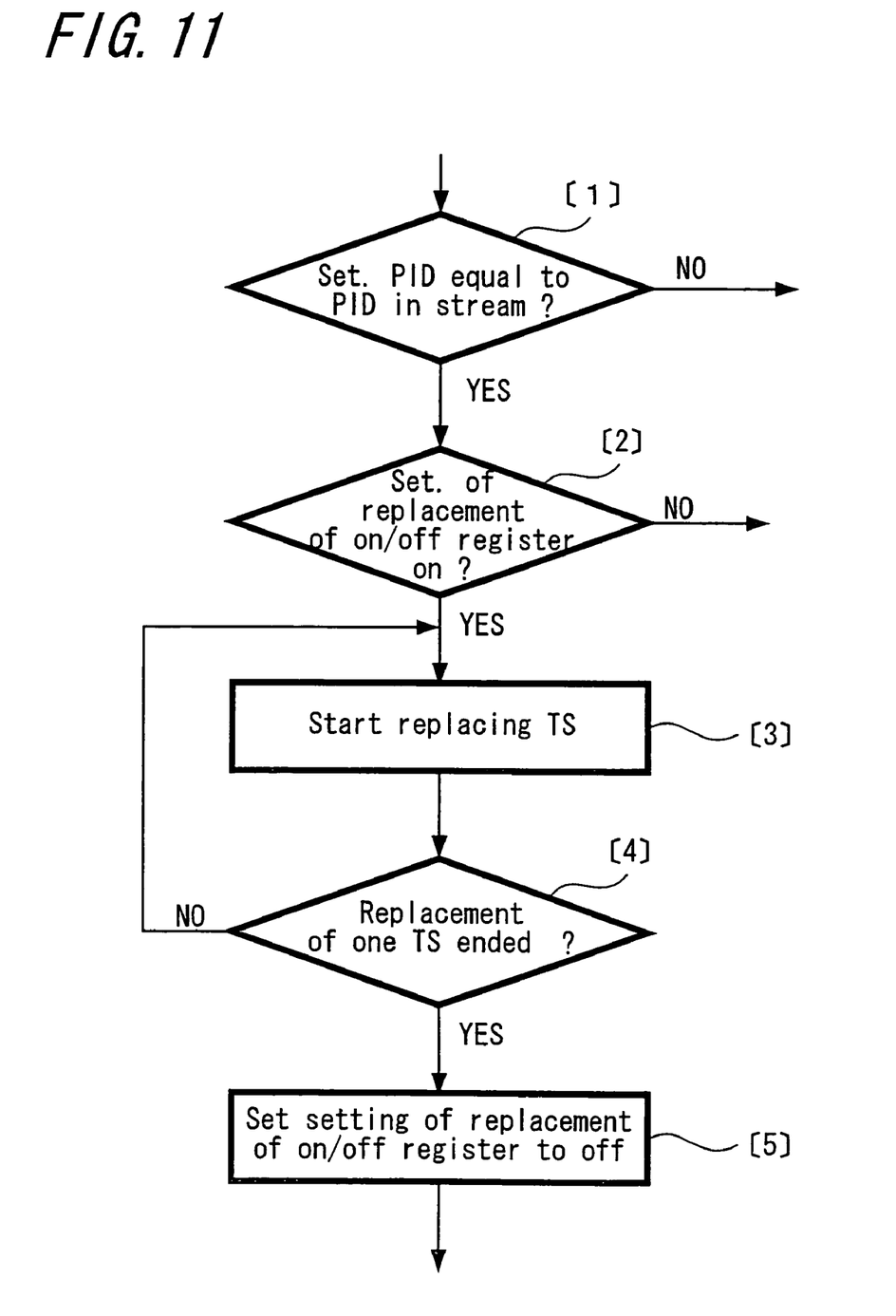
FIG. 11 is a flowchart to which reference will be made in explaining the manner in which a stream having a PID-A over a plurality of transport streams TS should be replaced.

FIG. 11 is a flowchart showing a method of replacing a series of transport streams TS laid across a plurality of transport streams TS. Whether the transport stream TS of a certain PID is replaced or not is determined by a register that is set under control of the system controller. The system controller is able to set (ON/OFF) whether the transport stream TS is to be replaced with the transport stream TS of the replaced PID. That is, when the setting of the ON/OFF register is set to "1", the transport stream TS of the PID is replaced, and when the setting of the ON/OFF register is set to "0", the transport stream TS of the PID is not replaced.

Referring to FIG. 11, when a certain PID is detected from the transport stream TS, control goes to the next decision step [1], whereat it is determined whether the detected PID is equal to the target PID that should be replaced. If the detected PID is equal to the target PID that should be replaced as represented by a YES at the decision step [1], then control goes to the next decision step [2]. At the decision step [2], in order to determine whether the detected PID should be replaced with the target PID to be replaced, it is determined whether the setting of the ON/OFF register is set to "ON" or "OFF". If the register is set to "ON" as represented by a YES at the decision step [2], then control goes to a step [3], wherein the replacement processing of the PID is started. The PID is replaced on the transport stream-by-transport stream basis. It can be judged by counting the bytes in the counter whether or not the replacement of one transport stream TS is ended. This decision is executed at the next decision step [4].

More specifically, if the replacement of one transport stream TS is not yet ended as represented by a NO at the decision step [4], then control goes back to the step [3] and thereby the replacement of the PID is continued. If the replacement of the PID is ended as represented by a YES at the decision step [4], then control goes to a step [5], whereat the ON/OFF register corresponding to this PID is set to "0" (OFF). With this arrangement, even when the same PID is inputted to the system next, the same data can be prevented from being replaced. If the same PID is set to another ON/OFF register and the ON/OFF setting of another register is set to "ON", then even the same PID can be replace with different data in accordance with the order in which the same PID is inputted.

Figure 12:
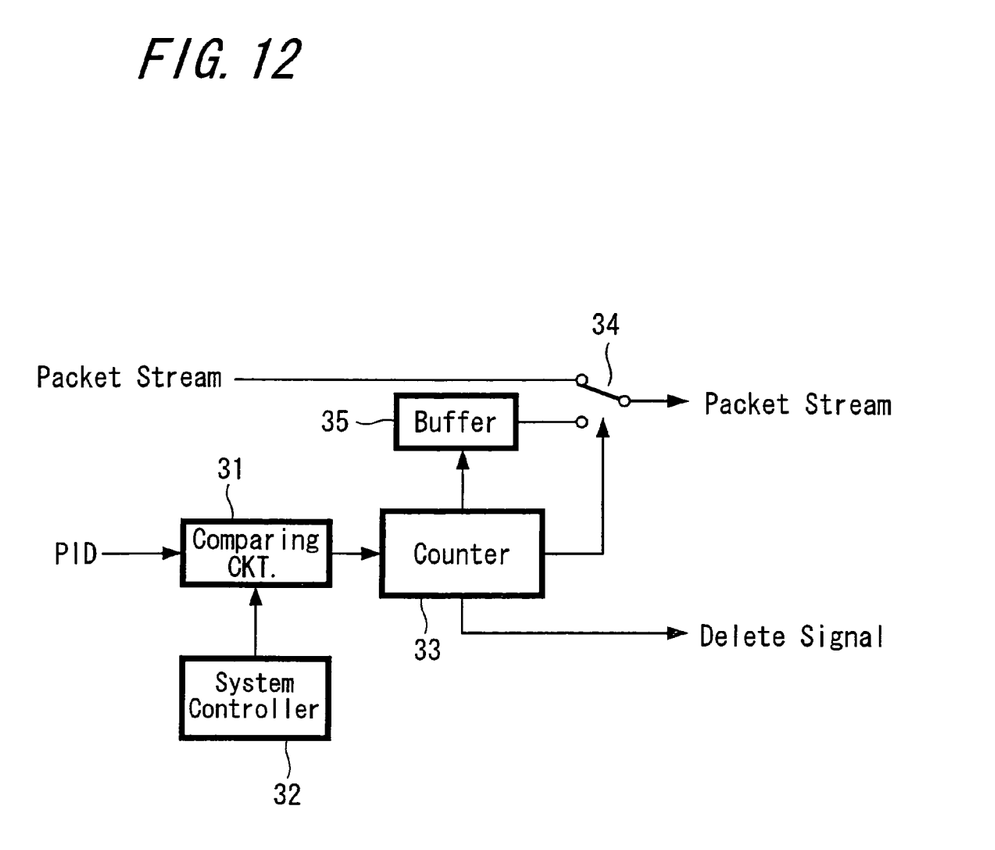
FIG. 12 a schematic block diagram showing an arrangement of a circuit that can replace or delete the transport stream TS.

Furthermore, the arrangement of the circuit by which the transport stream TS can be replaced or deleted will be described with reference to FIG. 12. As shown in FIG. 12, only when a leading pulse is inputted into the system, it is determined by a comparing circuit 31 whether the PID is identical to a value previously set by a system controller 32. More specifically, when one packet is processed, the PID is judged at the starting portion of the packet only once.

According to this arrangement, even when another PID is designated under control of the system controller 32 during the transport stream TS, for example, is being deleted, the deletion of the corresponding PID is continued to the end of that packet and a new PID is searched in the next packet. If the new PID is identical to the PID, then it can be deleted.

Also, n PIDs can be set and the comparing circuit 31 compares the PID in the inputted transport stream TS with n PIDs. If any one of the n PIDs is identical to the PID in the inputted transport stream TS and the replacement or the deletion is set, then the comparing circuit 31 supplies an information signal indicative of the compared result to a counter 33. Then, having received such information signal from the comparing circuit 32, the counter 33 counts its value in the ascending order only during the period in which an enable signal of data is being made active.

Further, when the PID is replaced, if the PID is identical to the PID in the inputted transport stream TS, then an output data selector 34 is switched from a buffer 35, an address within the buffer 35 is generated from the value of the counter 33 and such data is outputted byte by byte, whereby the PID in the inputted transport stream TS is replaced with the PID. In order to make the input transfer rate and the output transfer rate become identical to each other, the counter 33 counts its value in the ascending order only when the enable signal of the inputted stream is made active.

When the PID is deleted, the PID is deleted in such a manner that the enable signal inputted at the same time the data stream is inputted is made non-active to treat the data stream itself as a disable signal. More specifically, during the counter 33 is being activated, the enable signal is prevented from being outputted by operating the selector 34 and as a result, the enable signal is made non-active. Since the packet is constantly composed of the 188 bytes, when the effective data passes 188 bytes, the selector 34 is returned to the original position, and the non-active state of the enable signal is stopped. At the same time, the counter 33 also is reset.

When the packet is not deleted or when a transport stream TS which is different from the designated transport stream TS, the selector 34 is not operated, and hence the inputted data stream and the inputted enable signal are outputted directly.

When the above-described circuit is realized, only the specific transport stream TS in the inputted data stream can be replaced or deleted in a real-time fashion without recording it on a suitable means such as a disc. Also, the PIDs to be replaced are given a priority, whereby the transport stream TS across a plurality of transport streams TS can be replaced.

Accordingly, in this embodiment, since the apparatus according to the present invention incorporates therein the PID detecting circuit for detecting the position of the PMT, the PMT of the inputted data stream can be replaced or deleted without using the recording medium such as the disc. In addition, at that time, the incorporated CPU is not used and the signal indicating that the PMT is deleted is omitted, and hence the circuit can be simplified in arrangement.

Thus, the related-art apparatus has encountered with the problems in which it is unable to replace the packets indicative of attribute of data satisfactorily because a load on a control circuit is increased, a large-storage capacity disc and a special circuit are required so that the related-art apparatus become costly. Accordingly, the present invention can solve these problems easily.

More specifically, according to the present invention, the packet having the PID which has been set to be deleted by the control circuit can be deleted in a real-time fashion. Also, the packet having the PID that has been set to be replaced can be replaced at the inputted transfer rate without the recording medium such as the disc.

When the target stream to be replaced lies across a plurality of transport streams TS, there are prepared a plurality of buffers in which replaced data are maintained and these buffers are given a priority, whereby the stream larger than the unit packet can be replaced.

Therefore, according to this method, although the data can be copied in the inside of the satellite broadcasting receiver, when the data is outputted to the outside of the satellite broadcasting receiver, such data can be protected from being copied. Further, at the same time, the load on the control circuit such as the CPU can be decreased as compared with the method in which the CPU itself searches and replaces the PMT.

As described above, since the above-mentioned signal processing apparatus comprises the means for detecting the attribute information of the stream from the packet of the control information in the stream, the means for determining whether the detected attribute information and the previously-set information are identical to each other and the means for replacing or deleting the packet of the control information in accordance with other arbitrary setting if it is determined that the detected attribute information is identical to the set information, it can replace the packet indicative of the attribute of the data satisfactorily.

Also, since the above-mentioned signal processing method comprises the steps of receiving the packet of the control information together with the packet of the contents information in the form of the single stream, detecting the attribute information of the stream from the packet of the control information in the stream, determining whether the detected attribute information and the previously-set information are identical to each other and replacing or deleting the packet of the control information in accordance with other arbitrary setting if it is determined that the detected attribute information is identical to the set information, it can replace the packet indicative of the attribute of the data satisfactorily.

Further, since the above-mentioned recording limiting apparatus comprises the means for detecting the attribute information of the stream from the packet of the control information in the stream, the means for determining whether the detected attribute information and the previously-set information are identical to each other and the means for replacing or deleting the packet of the control information in accordance with other arbitrary setting if it is determined that the detected attribute information is identical to the set information, wherein the means for replacing or deleting the packet of the control information replaces the packet of the copy free control information with the packet of the copy guard control information and then outputs the replaced packet of the copy guard control information. Thus, although data can be copied in the inside of the satellite broadcasting receiver, when the data is outputted to the outside of the satellite broadcasting receiver, the data can be protected from being copied.

Furthermore, since the above-mentioned recording limiting method comprises the steps of detecting the attribute information of the stream from the packet of the control information in the stream, determining whether the detected attribute information and the previously-set information are identical to each other and replacing or deleting the packet of the control information in accordance with other arbitrary setting if it is determined that the detected attribute information is identical to the set information, wherein the step for replacing or deleting the packet of the control information replaces the packet of the copy free control information with the packet of the copy guard control information and then outputs the replaced packet of the copy guard control information. Thus, although data can be copied in the inside of the satellite broadcasting receiver, when the data is outputted to the outside of the satellite broadcasting receiver, the data can be protected from being copied.

According to the invention as claimed in claim 1, since the signal processing apparatus includes therein the circuit for detecting the PID to detect the position of the PMT, the PMT of the inputted stream can be replaced or deleted without using the recording medium such as the disc. Also, at that time, the on-chip CPU is not used and the signal indicating that the PMT has been deleted can be omitted, and hence the circuit can be simplified in arrangement.

According to the invention as claimed in claim 2, since the means for replacing or deleting the packet of the control information outputs the arbitrary packet previously stored in the memory means at the transfer rate equal to the transfer rate of the inputted stream to replace it with the packet of the control information in the stream if it is determined that the detected attribute information is identical to the previously-set information and if the detected attribute information is set to be replaced with the packet of the control information in accordance with other arbitrary setting, the signal processing apparatus can replace the packet satisfactorily.

According to the invention as claimed in claim 3, since the means for replacing or deleting the packet of the control information is provided with a plurality of previously set information and processes one previously-set information only once, it can replace the packets smoothly.

According to the invention as claimed in claim 4, since the means for replacing or deleting the packet of the control information is provided with a plurality of arbitrary packets and outputs the arbitrary packet in accordance with the arbitrary priority to replace the packet, with respect to the processing of the packets across a plurality of transport streams TS, the signal processing apparatus can replace the packet satisfactorily.

According to the invention as claimed in claim 5, since the means for replacing or deleting the packet of the control information replaces the packet of the copy free control information with the packet of the copy protect control information, although data can be copied in the inside of the satellite broadcasting receiver, when data is outputted to the outside of the satellite broadcasting receiver, such data can be protected from being copied.

According to the invention as claimed in claim 6, since the means for replacing or deleting the packet of the control information deletes the packet of the control information from the stream in accordance with other arbitrary setting if it is determined that the detected attribute information is identical to the set information, the signal processing apparatus can satisfactorily delete the packet.

According to the invention as claimed in claim 7, since the signal processing apparatus incorporates therein the PID detecting circuit for detecting the position of the PMT, the PMT of the inputted stream can be replaced or deleted without using the recording medium such as the disc. In addition, at that time, the incorporated CPU is not used and the signal indicating that the PMT is deleted is omitted, and hence the circuit can be simplified in arrangement.

According to the invention as claimed in claim 8, since the control information packet replacing or deleting step outputs an arbitrary packet previously stored in memory means at a transfer rate equal to a transfer rate at which the stream is inputted to the signal processing method to replace the control information packet in the stream with the arbitrary packet if it is determined that the detected attribute information is identical to the previously-set information and if the control information packet is set to be replaced in accordance with the other arbitrary setting, the packet can be replaced satisfactorily.

According to the invention as claimed in claim 9, since the control information packet replacing or deleting step includes a plurality of previously-set information and replaces or deletes the control information packet only once relative to one of the previously-set information, the packet can be replaced smoothly.

According to the invention as claimed in claim 10, since the control information packet replacing or deleting step includes a plurality of the arbitrary packets and outputs the arbitrary packets in accordance with an arbitrary priority to replace the control information packet with the arbitrary packet, when the packet across a plurality of transport streams TS is processed, the packet can be replaced satisfactorily.

According to the invention as claimed in claim 11, since the control information packet replacing or deleting step replaces the copy free control information packet with a copy guard control information packet, although the data can be copied in the inside of the satellite broadcasting receiver, for example, when the data is outputted to the outside of the satellite broadcasting receiver, such data can be protected from being copied.

According to the invention as claimed in claim 12, since the control information packet replacing or deleting step deletes the control information packet from the stream if it is determined that the detected attribute information is identical to the previously-set information and if the control information packet is set to be deleted in accordance with the other arbitrary setting, the packet can be deleted satisfactorily.

Further, according to the invention as claimed in claim 13, since the recording limiting apparatus incorporates therein the PID detecting circuit for detecting the position of the PMT, the PMT of the inputted stream can be replaced or deleted without using the recording medium such as the disc. In addition, at that time, the incorporated CPU is not used and the signal indicating that the PMT is deleted is omitted, and hence the circuit can be simplified in arrangement.

According to the invention as claimed in claim 14, since the control information packet replacing or deleting means outputs an arbitrary packet previously stored in memory means at a transfer rate equal to a transfer rate at which the stream is inputted to the signal processing method to replace the control information packet in the stream with the arbitrary packet if it is determined that the detected attribute information is identical to the previously-set information and if the control information packet is set to be replaced in accordance with the other arbitrary setting, the packet can be replaced satisfactorily.

According to the invention as claimed in claim 15, since the control information packet replacing or deleting means includes a plurality of previously-set information and replaces or deletes the control information packet only once relative to one of the previously-set information, the packet can be replaced smoothly.

According to the invention as claimed in claim 16, since the control information packet replacing or deleting means includes a plurality of the arbitrary packets and outputs the arbitrary packets in accordance with an arbitrary priority to replace the control information packet with the arbitrary packet, when the packet across a plurality of transport streams TS is processed, the packet can be replaced satisfactorily.

According to the invention as claimed in claim 17, since the control information packet replacing or deleting means deletes the control information packet from the stream if it is determined that the detected attribute information is identical to the previously-set information and if the control information packet is set to be deleted in accordance with the other arbitrary setting, the packet can be deleted satisfactorily.

According to the invention as claimed in claim 18, since the circuit for detecting the PID to detect the position of the PMT is included, although data can be copied in the inside of the satellite broadcasting receiver, for example, when the data is outputted to the outside of the satellite broadcasting receiver, such data can be protected from being copied. Further, at that time, since the incorporated CPU is not used and the signal indicating that the PMT has been deleted is omitted, the circuit can be simplified in arrangement.

According to the invention as claimed in claim 19, since the means for replacing or deleting the packet of the control information outputs the arbitrary packet previously stored in the memory means at the transfer rate, equal to the transfer rate of the inputted stream to replace it with the packet of the control information in the stream if it is determined that the detected attribute information is identical to the previously-set information and if the detected attribute information is set to be replaced with the packet of the control information in accordance with other arbitrary setting, the packet can be replaced satisfactorily.

According to the invention as claimed in claim 20, since the means for replacing or deleting the packet of the control information is provided with a plurality of previously set information and processes one previously-set information only once, the packet can be replaced smoothly.

According to the invention as claimed in claim 21, since the means for replacing or deleting the packet of the control information is provided with a plurality of arbitrary packets and outputs the arbitrary packet in accordance with the arbitrary priority to replace the packet, with respect to the processing of the packets across a plurality of transport streams TS, the packet can be replaced satisfactorily.

According to the invention as claimed in claim 22, since the means for replacing or deleting the packet of the control information deletes the packet of the control information from the stream in accordance with other arbitrary setting if it is determined that the detected attribute information is identical to the set information, the packet can be deleted satisfactorily.

Thus, the related-art apparatus has encountered with the problems in which it is unable to replace the packets indicative of attribute of data satisfactorily because a load on a control circuit is increased, a large-storage capacity disc and a special circuit are required so that the related-art apparatus become costly. Unlike the related art, according to the present invention, it is possible to solve these problems easily.

Having described preferred embodiments of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A signal processing apparatus into which a control information packet is inputted together with a contents information packet in the form of a single stream, comprising:
    means for detecting a leading pulse in the single data stream;
    means for detecting, relative to the leading pulse, attribute information of said stream from said control information packet;
    means for determining whether said detected attribute information is identical to previously-set information; and
    means for replacing or deleting said control information packet in accordance with a predetermined setting when said detected attribute information is identical to said previously-set information, the control information packet being outputted to said stream when the detected attribute information is different from the previously-set information.

2. The signal processing apparatus according to claim 1, wherein said means for replacing or deleting replaces the control information packet by outputting a packet previously stored in memory means at a transfer rate equal to a transfer rate at which said stream is inputted to said signal processing apparatus, when said detected attribute information is identical to said previously-set information and said control information packet is to be replaced in accordance with said predetermined setting.

3. The signal processing apparatus according to claim 2, wherein said means for replacing or deleting replaces or deletes said control information packet only once relative to one of a plurality of previously-set information.

4. The signal processing apparatus according to claim 2, wherein said means for replacing or deleting outputs a plurality of predetermined packets, in accordance with a predetermined priority, to replace said control information packet.

5. The signal processing apparatus according to claim 1, wherein said means for replacing or deleting replaces said control information packet with a copy guard control information packet.

6. The signal processing apparatus according to claim 1, wherein said means for replacing or deleting deletes said control information packet from said stream when said detected attribute information is identical to said previously-set information and said control information packet is to be deleted in accordance with said predetermined setting.

7. A signal processing method for controlling a signal processing apparatus into which a control information packet is inputted together with a contents information packet in the form of a single stream, comprising the steps of:
    detecting, in a data control circuit, a leading pulse in the single stream;
    detecting, in the data control circuit, attribute information of said stream from said control information packet in said stream relative to the leading pulse;
    determining, in a system controller, whether said detected attribute information is identical to previously-set information; and
    replacing or deleting, in the data control circuit, said control information packet in accordance with a predetermined setting if it is determined that said detected attribute information is identical to said previously-set information, the control information packet being output to the single stream when the detected attribute information is different from the previously-set information.

8. signal processing method according to claim 7, wherein in said replacing or deleting a predetermined packet previously stored in memory is output at a transfer rate equal to a transfer rate at which said stream is inputted to said signal processing apparatus, the predetermined packet replacing said control information packet in said stream when said detected attribute information is identical to said previously-set information and said control information packet is set to be replaced in accordance with said predetermined setting.

9. The signal processing method according to claim 8, wherein in said replacing or deleting said control information packet is deleted or replaced only once relative to one of a plurality previously-set information.

10. The signal processing method according to claim 8, wherein in said replacing or deleting a plurality of predetermined packets are output in accordance with a predetermined priority to replace said control information packet.

11. The signal processing method according to claim 7, wherein in said replacing or deleting the control information packet is replaced with a copy guard control information packet.

12. The signal processing method according to claim 7, wherein in said replacing or deleting said control information packet is deleted from said stream when said detected attribute information is identical to said previously-set information and said control information packet is to be deleted in accordance with said predetermined setting.

13. A recording limiting apparatus for use in recording an information signal into which a control information packet is inputted together with a contents information packet in the form of a single stream, comprising:
  means for detecting a leading pulse in the single stream;
  means for detecting attribute information of said stream from said control information packet relative to the leading pulse;
  means for determining whether said detected attribute information is identical to previously-set information; and
  means for replacing or deleting said control information packet in accordance with a predetermined setting when said detected attribute information is identical to said previously-set information, the control information packet being output to the single stream when the detected attribute information is different from the previously-set information,
  wherein said means for replacing or deleting outputs a processed output to a means for recording after replacing said control information packet with a copy guard control information packet.

14. The recording limiting apparatus according to claim 13, wherein said means for replacing or deleting outputs a predetermined packet previously stored in memory at a transfer rate equal to a transfer rate at which said stream is inputted to said information signal, the predetermined packet replacing said control information packet in said stream when said detected attribute information is identical to said previously-set information and said control information packet is set to be replaced in accordance with said other arbitrary setting.

15. The recording limiting apparatus according to claim 14, wherein said means for replacing or deleting replaces or deletes said control information packet only once relative to one of a plurality of previously-set information.

16. The recording limiting apparatus according to claim 14, wherein said means for replacing or deleting outputs a plurality of predetermined packets in accordance with a predetermined priority to replace said control information packet.

17. The recording limiting apparatus according to claim 13, wherein said means for replacing or deleting replaces said control information packet with a copy guard control information packet.

18. A recording limiting method for causing a signal processing apparatus to record an information signal into which a control information packet is inputted together with a contents information packet in the form of a single stream, comprising:
  detecting, in a data control circuit of the signal processing apparatus, a leading pulse in the single stream;
  detecting, in the data control circuit, attribute information of said stream from said control information packet relative to the leading pulse;
  determining, in a system controller of said signal processing apparatus, whether said detected attribute information is identical to previously-set information; and
  replacing or deleting, in the data control circuit, said control information packet in accordance with a predetermined setting when said detected attribute information is identical to said previously-set information, the control information packet being output to the single stream when the detected attribute information is different from the previously-set information,
  wherein in said replacing or deleting a processed output is transmitted to a recording device after said control information packet is replaced with a copy guard control information packet.

19. The recording limiting method according to claim 18, wherein in said replacing or deleting a predetermined packet, previously stored in memory at a transfer rate equal to a transfer rate at which said stream is inputted to said information signal, is output to replace said control information packet in said stream when said detected attribute information is identical to said previously-set information and said control information packet is set to be replaced in accordance with said other arbitrary setting.

20. The recording limiting method according to claim 19, wherein in said replacing or deleting said control information packet is replaced or deleted only once relative to one of a plurality of previously-set information.

21. The recording limiting method according to claim 19, wherein in said replacing or deleting a plurality of predetermined packets are output in accordance with a predetermined priority to replace said control information packet.

22. The recording limiting method according to claim 18, wherein in said replacing or deleting said control information packet is deleted from said stream when said detected attribute information is identical to said previously-set information and said control information packet is set to be deleted in accordance with said other arbitrary setting.

* * * * *